United States Patent Office 3,480,852
Patented Nov. 25, 1969

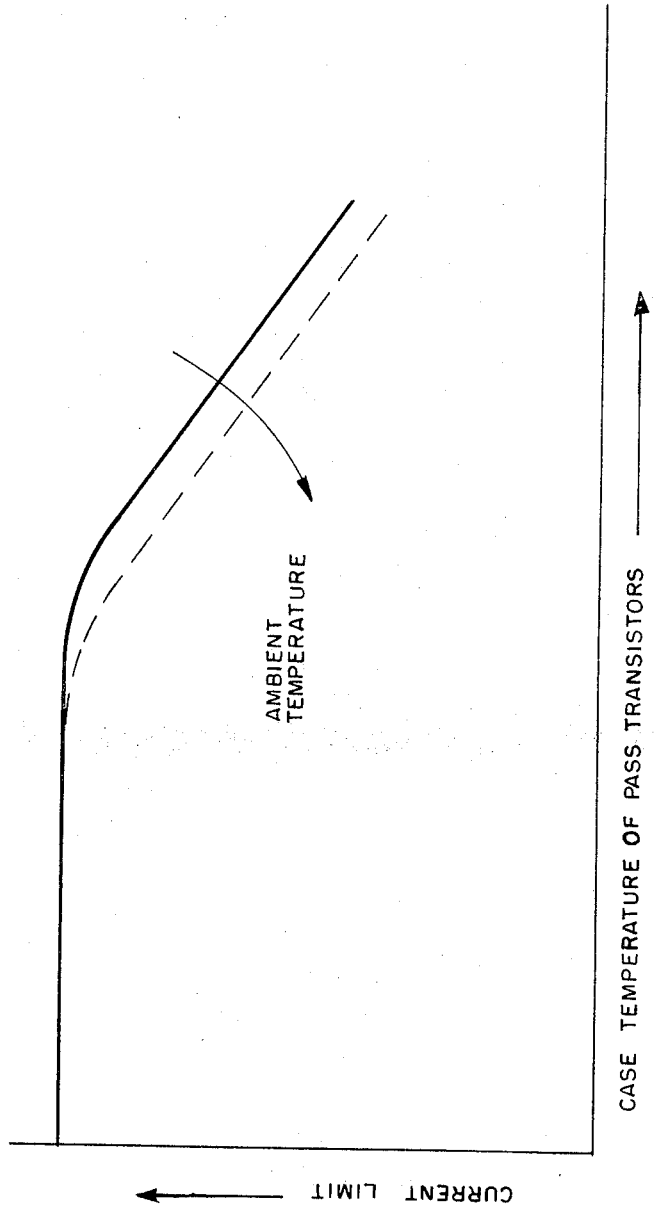

3,480,852
AMBIENT AND COMPONENT TEMPERATURE COMPENSATED VOLTAGE CURRENT REGULATOR
Han-Min Hung, Cambria Heights, N.Y., assignor to Forbro Design Corp., New York, N.Y., a corporation of New York
Filed Oct. 20, 1967, Ser. No. 676,867
Int. Cl. G05f 1/40, 1/52; H02j 1/04
U.S. Cl. 323—4                                 5 Claims

ABSTRACT OF THE DISCLOSURE

A current limiting circuit monitors the combination of the case temperature of pass transistors or other components and the ambient temperature. When the combination of temperatures exceeds a preset value, the circuit will modify the action of the current limiting circuit or constant current regulator in such a manner as to reduce the current flowing through the pass transistors to a safe operating region, i.e., lower the current limit automatically in situations of high ambient temperature.

BACKGROUND OF THE INVENTION

Field of the invention

The invention relates to current magnitude control systems.

Description of the prior art

In a voltage regulated power supply, if no means is provided for limiting the output current to a safe value, the power supply will attempt to supply maximum power into a lower impedance load as, for example, a short circuit. This may result in excessive current being drawn from the power supply causing damage, particularly, to such things as transistor pass elements. In order to improve this situation, current limiting means are generally provided in voltage regulated power supplies. In addition, the temperature of the pass transistor or other vulnerable components may be sensed and the maximum current limited accordingly or the power supply may even be shut down. Typical prior art systems may be found in Patent No. 3,056,905 entitled Protective System for Transistors; Patent No. 3,088,053 entitled Relay Control Circuit; and Patent No. 3,243,690 entitled Voltage Regulated Power Supply with Adjustable Current Limit.

SUMMARY

In accordance with the present invention an additional control function is added to a power supply incorporating current limiting and/or current regulation with pass transistor temperature sensing. The additional factor comprises sensing the ambient temperature and utilizing such sensed temperature as a means for providing additional safety control for the system. It has been found that by doing this higher levels of output current ratings can be applied safely than has hitherto been possible.

In the drawings:

FIGURE 4 is a graphical representation of the way in which the present invention operates.

Figure 1:
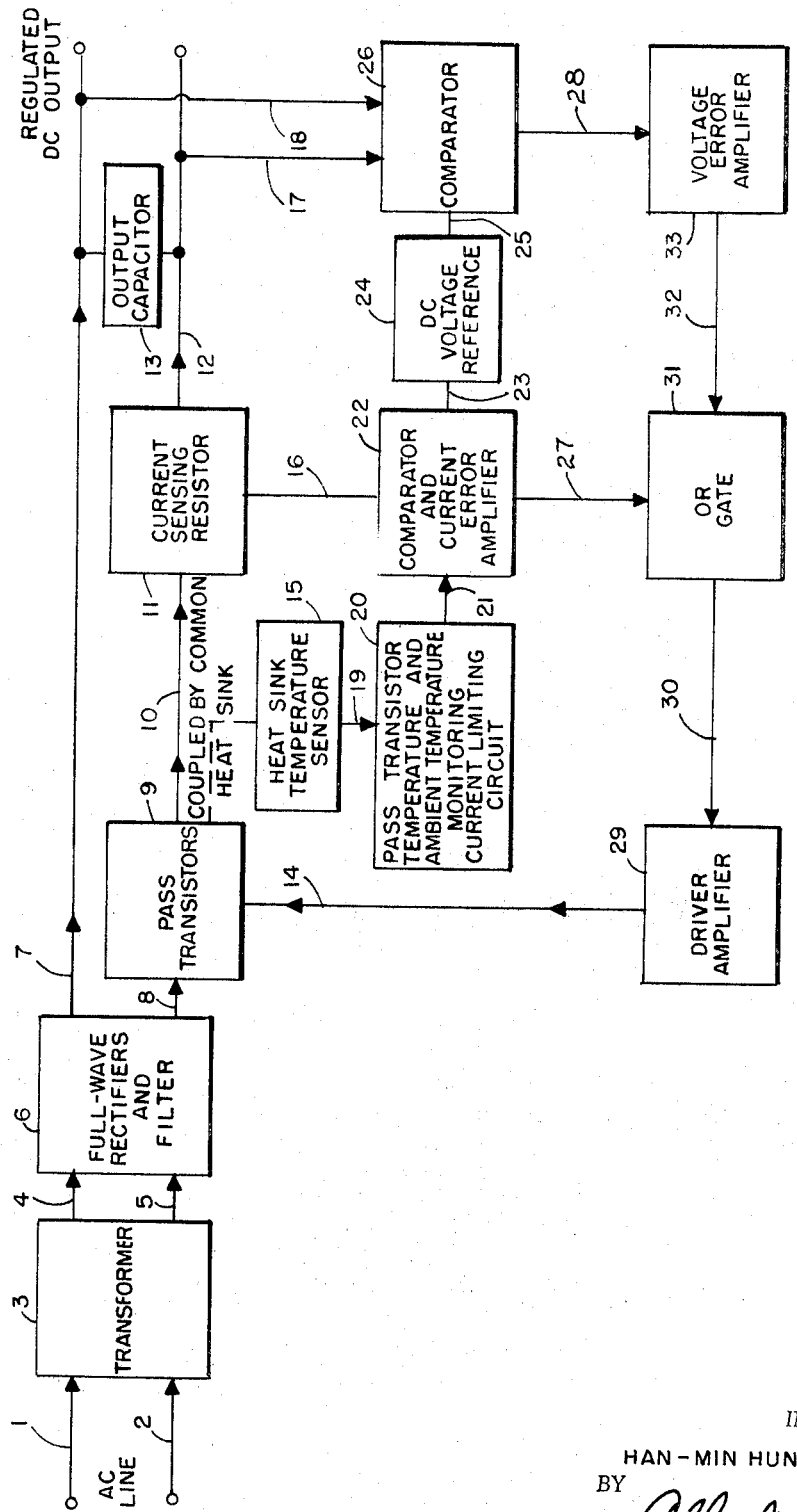
FIGURE 1 is a block diagram of the basic form of the present invention.

The block diagram shown in FIGURE 1 illustrates the principle of operation of the present invention. Input power from alternating current lines 1 and 2 is applied to the primary of transformer 3. The secondary of transformer 3 applies alternating current voltage over lines 4 and 5 to full wave rectifiers and filter 6. The rectified and filtered output from rectifiers and filter 6 appear across lines 7 and 8. Line 7 may be considered one side of the output circuit. The other side of the output circuit supplied from line 8 passes through pass transistors 9, over line 10, through current sensing resistor 11, and out over line 12. An output capacitor 13 is generally bridged across the output lines 7 and 12. It will be assumed for purposes of this description that the output across lines 7 and 12 is a regulated DC output. This regulated DC output voltage is fed back to comparator 26 over lines 17 and 18. The comparator 26 compares the output voltage across these lines with the DC reference voltage over line 25 from DC reference voltage source 24. The output of comparator 26 will be an error voltage which is applied over line 28 to error amplifier 33 and the output of this amplifier is applied over line 32 to OR gate 31. This describes the voltage regulating portion of the circuit up to the OR gate. The current regulating portion of the circuit includes a comparator 22 supplied with voltage from current sensing resistor 11 over line 16 and a voltage from reference 24 over line 23. The output of comparator 22 is applied over line 27 to OR gate 31. OR gate 31 selects the larger of the two signals from the current and voltage amplifiers and applies the selected voltage over line 30 to driver amplifier 29 which in turn drives pass transistor 9 over line 14. The components described so far constitute a conventional voltage/current regulated power supply with automatic cross-over. The present invention concerns additional information supplied to the control circuits by heat sink temperature the current comparator error amplifier 22 where it combines with the current control information. The heat sink temperature sensor 15 is thermally coupled to the heat sink of pass transistor 9. The heat sink temperature sensor is connected electrically to the pass transistor temperature and ambient temperature monitoring current limiting circuit 20. When the temperature of the heat sink of the pass transistor 9, and the ambient temperature, exceed a preset value, the output of pass transistor temperature and ambient temperature monitoring current limiting circuit 20 will modify the normal current limiting function of the comparator and current error amplifier 22. Moreover, when the combination of temperature is lower than the preset limit, the normal current limiting function of the comparator and current limiting amplifier 22 will not be altered. The details of how these circuits operate will be supplied in the description of FIGURES 2 and 3 given below.

Figure 2:
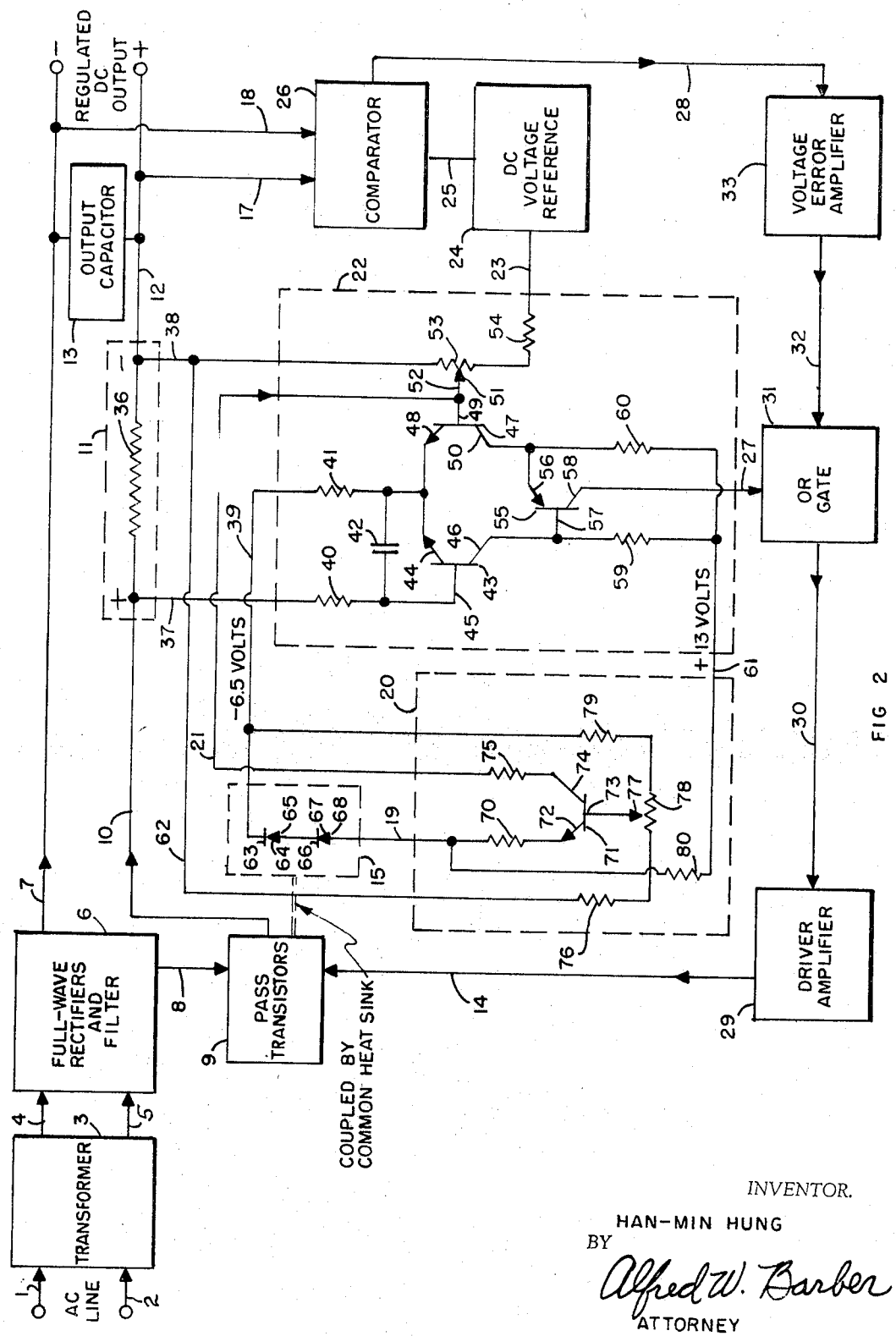
FIGURE 2 shows schematic circuit details of one form of the present invention.

FIGURE 2 shows schematic details of the current sensing resistor 11, heat sink temperature sensor 15, comparator and current error amplifier 22, and one form of the pass-transistor temperature and ambient temperature monitoring current limiting circuit 20 as described above in connection with FIGURE 1. One end of current sensing resistor 36 is connected over lead 37 through resistor 40 to base 45 of transistor 43. The other end of current sensing resistor 36 is connected over lead 38 to one end of potentiometer 53 the other end of which is connected through resistor 54 to line 23 from the voltage reference source 24. Transistor 43 together with transistor 47 comprise a differential pair of NPN transistors. A portion of the voltage across potentiometer 53 appearing at movable contact 51 is applied over lead 52 to base 49 of transistor 47. Emitter 44 of transistor 43 and emitter 48 of transistor 47 are tied together and to a common emitter resistor 41, which in turn, is tied to minus voltage bus 39. Capacitor 42 is connected from base 45 to emitter 44 of transistor 43. Resistor 40 together with capacitor 42 form a time delay or lag network. Collectors 46 and 50 of transistors 43 and 47 respectively are connected to load resistors 59 and 60. The other ends of resistors 59 and 60 are tied to plus voltage bus 61. Base 57 and emitter 56 of PNP transistor 55 are connected respectively to collectors 46 and 50 of transistors 43 and 47. The collector 58 of transistor 55 goes to OR gate 31 via lead 27. The ordinary current limiting action is as follows: The signal receiving base 45 of differential amplifier 43–47 acquires the voltage drop across sensing resistor 36. When the current sampling voltage is higher than the divided reference voltage at base 49, transistor 43 will be more conducting while transistor 47 will be less conducting. The potential of collector 46 of transistor 43 decreases while that of collector 50 of transistor 47 increases. Transistor 55 will then be conducting to provide a dominant signal to OR gate 31. The output of OR gate 31 will cause driver amplifier 29 to become less conducting and the resistance of pass transistor 9 will be increased to maintain the output current of the power supply constant. Diodes 64 and 67 are mounted on the heat sink of pass transistor 9 to sense the case temperature of the pass transistor 9. The anode 68 of diode 67 is connected to emitter resistor 70 and also resistor 80, while the other end of resistor 80 is tied to plus voltage bus 61 to provide the bias current to diodes 64 and 67. The cathode 66 of diode 67 is in series with anode 65 of diode 64. The cathode 63 of diode 64 is connected back to the minus bus 39. Emitter resistor 70 is connected from emitter 72 of NPN transistor 71, whose collector 74 is connected through load resistor 75 to reference base 49 of differential amplifier 43–47 over lead 21. The base 73 of transistor 71 is tied to movable contact 77 of potentiometer 78 which is in series with resistors 76 and 79 across the minus bus 39 and amplifier common bus 62. Potentiometer 78 setting corresponds to a certain combination of case temperature of pass transistor 9 and ambient temperature at which the ordinary current limiting action will be modified. An increase in case temperature of pass transistor 9 will cause decrease in the forward drops of diodes 64 and 67 at a linear rate of approximately two millivolts per degree centigrade. The base to emitter diode of transistor 71 is in series with diodes 64 and 67 and this transistor is exposed to the ambient providing a temperature sensitive forward drop in accordance with the ambient temperature. Since there are two diode forward drops coupled to the case of pass transistor 9, and only one coupled to the ambient, the case temperature will have more influence than the ambient temperature on the control function. As the combination of temperatures increases, it reaches a condition where transistor 71 starts conducting at which time the collector voltage of transistor 71 reduces as does the potential at reference base 49. As a result, the divided reference voltage at the movable contact 51 of potentiometer 53 is reduced as the combination of temperatures exceeds a certain preset limit as if the setting of contact 51 of current limiting potentiometer 53 were automatically lowered by the combination of temperatures. As the current limit is automatically lowered as the result of increases in heat sink temperature and ambient temperature, the pass transistor 9 will always be operated within safe operating region even under extreme ambient temperature conditions.

FIGURE 4 shows the current limit as controlled by the case temperature of pass transistor 9 with the ambient temperature as a parameter. The negative slope of current limit in FIGURE 4 can be determined by selection of emitter resistor 70.

Figure 3:
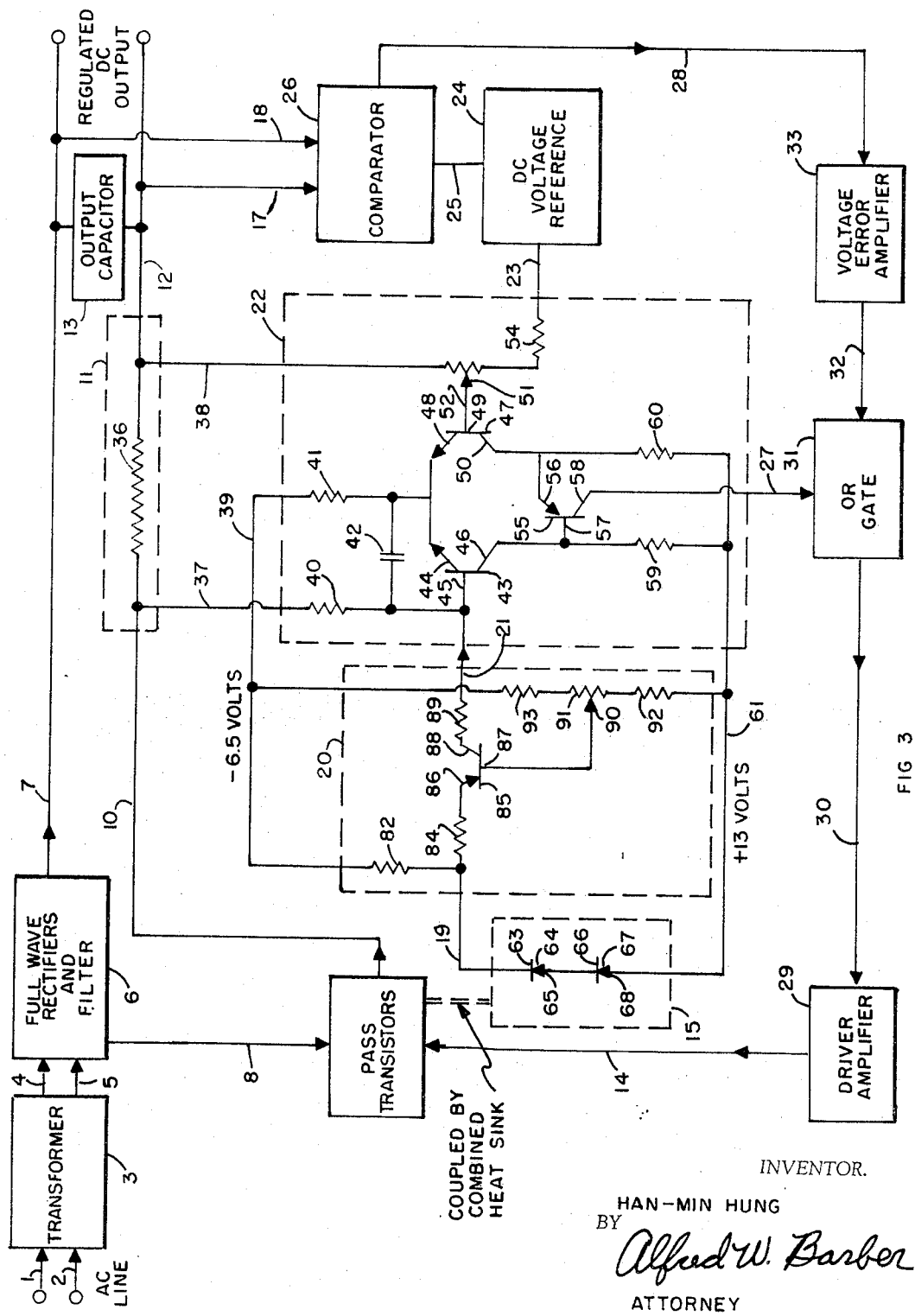
FIGURE 3 shows schematic circuit details of a modified form of the present invention.

FIGURE 3 shows a similar, part schematic, part block-diagram, of a modified form of the present invention. The components in block 22 remain unchanged and its ordinary current limiting function is the same as described above. Diodes 64 and 67 are again mounted on the heat sink of pass transistor 9. The anode 68 of diode 67 is again in series with anode 65 of diode 64, cathode 63 of diode 64 is connected via lead 19 to emitter resistor 84 and through resistor 82 back to minus bus 39. Resistor 82 provides the bias current for diodes 64 and 67. A voltage divider consisting of resistor 92, potentiometer 91 and resistor 93 is connected across plus bus 61 and minus bus 39. The movable contact 90 of potentiometer 91 is tied to base 87 of PNP transistor 85, whose emitter 86 goes to emitter resistor 84. Collector 88 of transistor 85 goes to resistor 89 then to base 45 of differential amplifier 43–47. A certain setting of movable contact 90 of potentiometer 91 corresponds to a certain combination of case temperature of pass transistor 9 and ambient temperature above which transistor 85 will be turned on. As this potential at collector 88 and base 45 of differential amplifier 43–47 is thus raised, the current limit is automatically lowered.

While the circuits of FIGURES 2 and 3 assume that the pass transistors 9 are NPN devices, it will be understood that other pass devices may be used and that PNP pass devices may be used by reversing polarities in the circuit.

I claim:
1. In a regulated power supply, the combination of;
a source of unregulated voltage;
a pair of output terminals;
signal responsive current control means and a current sensing resistor connected between said source and said output terminals, wherein said control means generates substantial amounts of heat;
a feedback circuit connected between said sensing resistor and said control means for supplying a signal to said control means in accordance with the voltage drop across said sensing resistor;
and thermally responsive means thermally coupled to said control means and connected to said feedback circuit for modifying said signal in response to a predetermined temperature level of said control means.

2. A regulated power supply as set forth in claim 1, wherein said thermally responsive means includes means for adjusting said predetermined temperature.

3. A regulated power supply as set forth in claim 1, and including an OR gate in series with said feedback circuit and output voltage control means coupled between said output terminals and said OR gate.

4. A regulated power supply as set forth in claim 1, and including second thermally responsive means responsive to ambient temperatures coupled to said control means for modifying the action of the first said thermally responsive means in accordance with ambient temperatures.

5. A regulated power supply as set forth in claim 1, and including second thermally responsive means responsive to ambient temperatures coupled to said control means for modifying the action of the first said thermally responsive means in accordance with ambient temperatures and means for adjusting the relative effects of said first and second thermally responsive means on said control means.

References Cited

UNITED STATES PATENTS

| | | | |
|---|---|---|---|
| 3,305,763 | 2/1967 | Kupferberg et al. | 323—9 |
| 3,388,316 | 6/1968 | Gately | 323—22 X |
| 3,421,102 | 1/1969 | Andrews | 307—310 X |

JOHN F. COUCH, Primary Examiner

G. GOLDBERG, Assistant Examiner

U.S. Cl. X.R.

307—310; 317—33; 321—19; 323—9, 20, 22, 68